United States Patent [19]

Willibrordus

[11] 4,419,963

[45] Dec. 13, 1983

[54] FEEDING RAILING

[76] Inventor: Weelink J. M. Willibrordus, No. 10, Brandersdijk,, 7136 KV Zieuwent, Netherlands

[21] Appl. No.: 363,953

[22] Filed: Mar. 31, 1982

[30] Foreign Application Priority Data

Mar. 31, 1981 [NL] Netherlands ............... 8101597

[51] Int. Cl.$^3$ ............................................. A01K 5/00
[52] U.S. Cl. ................................... 119/51 R; 119/58
[58] Field of Search ................. 119/58, 60, 54, 51 R, 119/20, 16, 53

[56] References Cited

U.S. PATENT DOCUMENTS 3,620,192 11/1971 Taylor ..................................... 119/54
4,009,687 3/1977 Korthals ................................ 119/60
4,148,278 4/1979 Anderson ............................... 119/60

FOREIGN PATENT DOCUMENTS 1465020 2/1977 United Kingdom ................. 119/60

Primary Examiner—Jay Neskovitz
Attorney, Agent, or Firm—Diller, Ramik & Wight

[57] ABSTRACT

A feeding railing for animals comprising a frame, a plurality of vertical spikes fastened to said frame and adapted to extend pairwise behind the animal's head on both sides of the neck and being spaced apart by a distance which is larger than the width of the neck and smaller than the width of the withers of the animal and comprising at least one wheel supporting the frame so as to be movable along the ground, comprising a frame which has connected with it a floor plate extending rearwardly over a given distance near the ground. Driving means comprising buffer means for the wheel for storing energy during the rotation of the or each wheel in one direction and by releasable guard means for blocking the rotation in the other direction can be provided.

13 Claims, 5 Drawing Figures

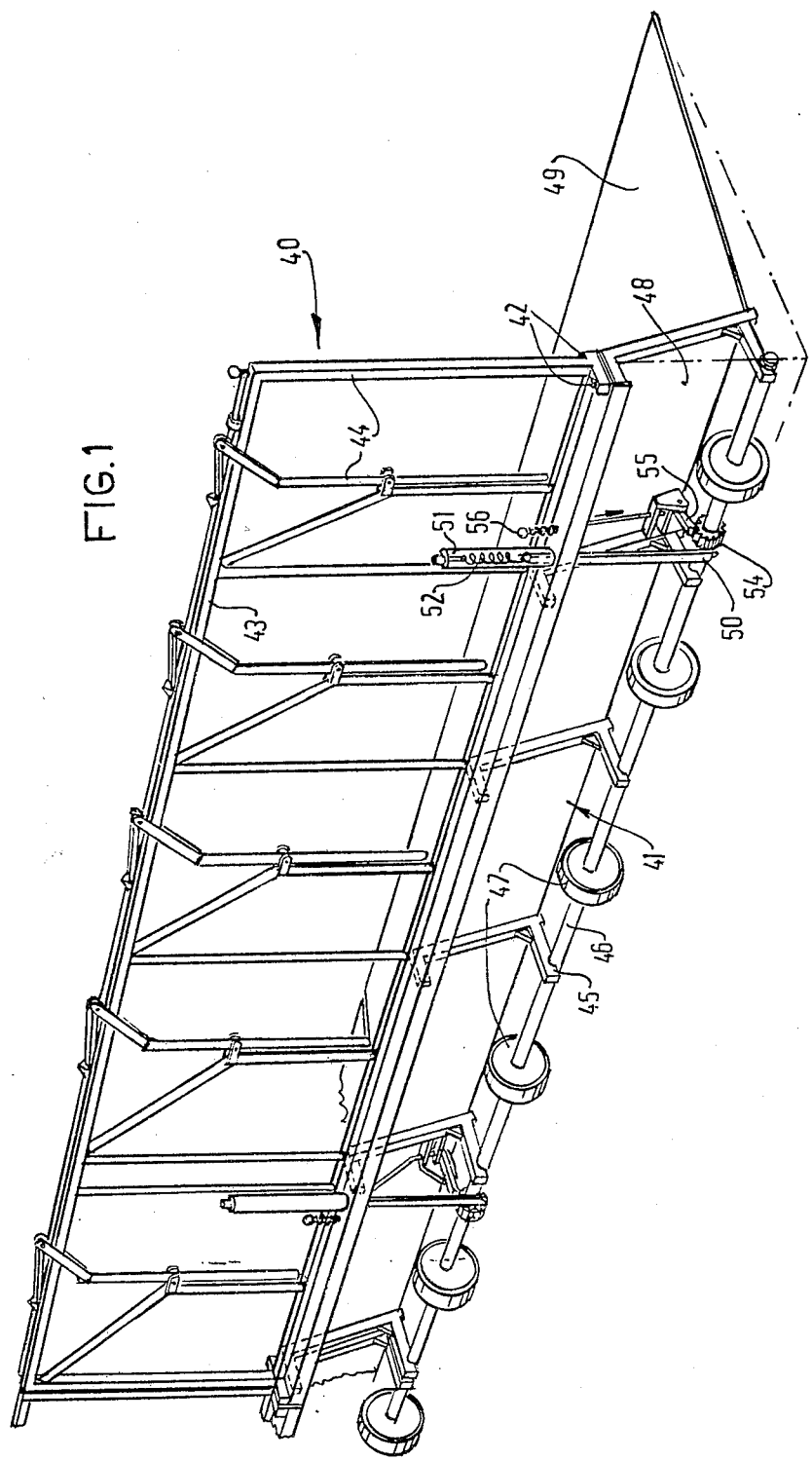

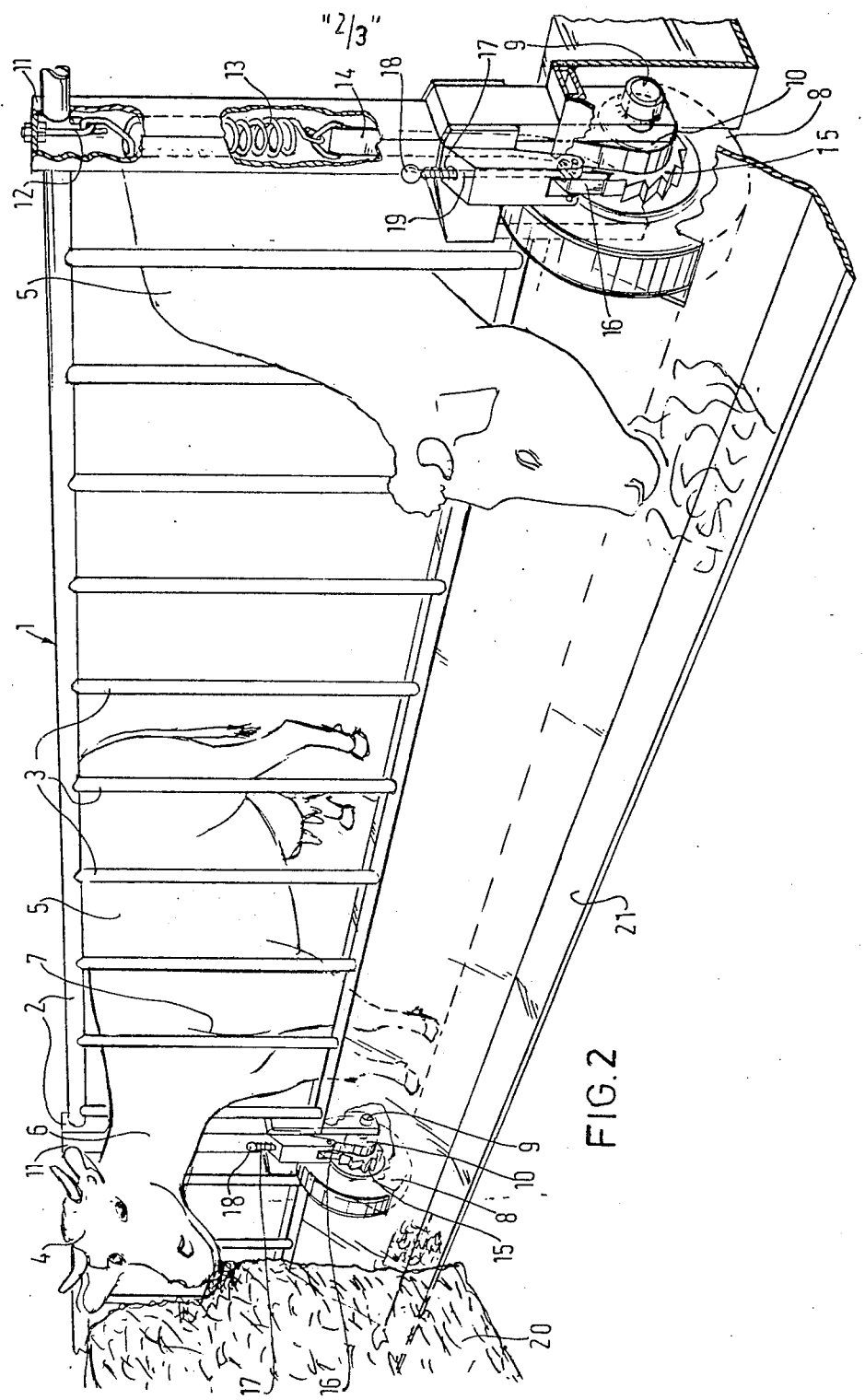

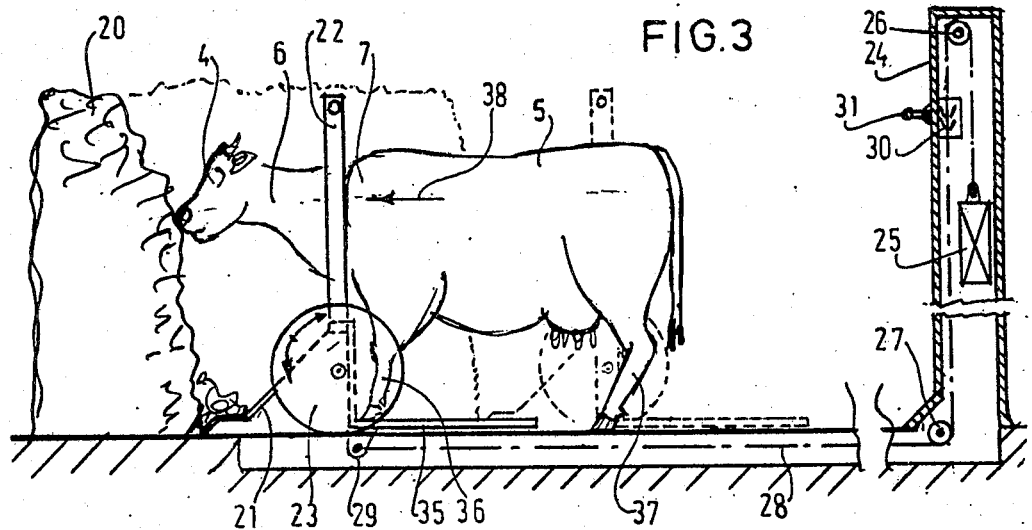
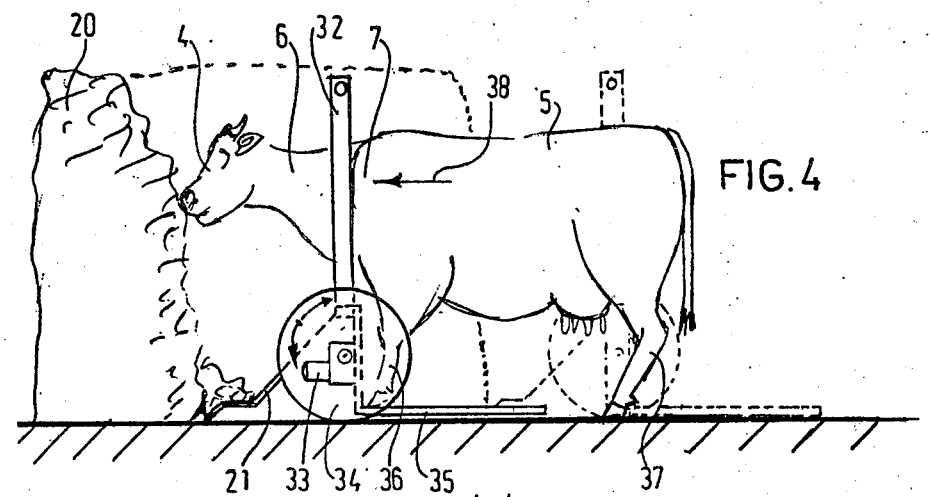
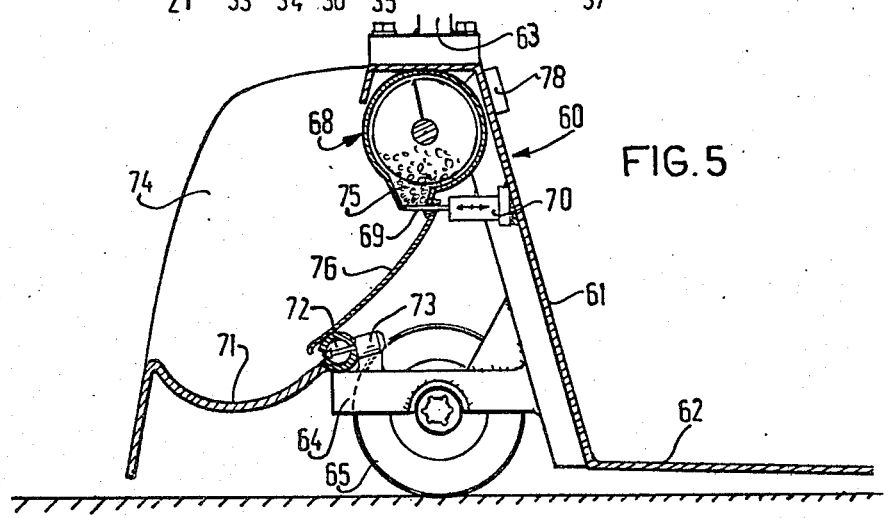

FEEDING RAILING

The invention relates to a feeding railing for animals comprising a frame, a plurality of vertical spikes attached to said frame and intended to extend pairwise on both sides behind the animal's head along the neck, the distance between said spikes being larger than the width of the neck and smaller than the width of the animal's withers and comprising at least one wheel supporting the frame so as to be movable along the ground.

Such a feeding railing is known from U.S. Pat. No. 3,620,192. This feeding railing is gradually advanced by the animals themselves when picking up the fodder. For the sake of stability this known feeding railing is provided not only with wheels at the underside but also with wheels movable along a rail arranged on longitudinal walls. The feeding railing can, therefore, only be used in conjunction with the stationary walls.

The invention has for its object to provide a feeding railing of the kind set forth in the preamble, which can be advanced by the animals themselves during the progressive consumption of the fodder and which, during use, has such great stability of its own that no longitudinal walls for guiding and supporting are required.

According to the invention this is achieved in a feeding railing in that a floor plate extending rearwardly over a given distance near the ground is connected with the frame. When taking the fodder the animals stand with their forefeet on the floor plate and thus ensure the stability of the feeding railing. The hindlegs remain free of the floor plate so that it is still possible to push the feeding railing forwards.

In an advantageous embodiment the frame of the feeding railing mainly consists of a plate integral with the floor plate. At least on the rear side facing the animals a closed unit is thus formed.

When the stock of fodder has to be replenished it is necessary to displace the feeding screen to the rear. Particularly in the case of larger feeding railings this is a laborious and time-consuming operation. Usually it is necessary to use a tractor for returning the railing into its initial position. In a particularly advantageous embodiment of the invention the feeding railing is provided with driving means for the wheel comprising buffer means for storing energy during rotation of the wheel in one direction and releasable guard means for blocking the rotation in the other direction. During the advance of the feeding railing caused by the animals the buffer means store energy, which can afterwards be used for moving the feeding railing back.

In an advantageous embodiment the buffer means are formed by a helical spring, one end of which is coupled with the periphery of the wheel axle, whereas the other end is connected with the frame. This provides a very simple, but very effective, failure-insensitive construction.

It is known that animals such as cows have to take in not only the roughage available at the feeding railing but also additives in the form of concentrates. In order to ensure that the animals take up also this supplementary fodder a feeding railing according to the invention is provided with a supplementary fodder supply device.

In a very advantageous embodiment of the invention sensors of an animal identifying system controlling the supply device are connected with the frame near every pair of spikes. Such an animal identifying system is known per se. It ensures that the supply device dispenses an amount of supplementary fodder matching the individual animal's need.

Further particularities of the invention will be described with reference to the accompanying drawings.

FIG. 1 shows a perspective view of a first embodiment of a feeding railing is accordance with the invention;

FIG. 2 shows a perspective view, partly broken away, of a second embodiment of a feeding railing in accordance with the invention, in which the buffer means comprise a helical spring;

FIG. 3 shows a side elevation of a third embodiment of a feeding railing in accordance with the invention, in which the buffer means comprise a weight;

FIG. 4 shows a fourth embodiment of a feeding railing in accordance with the invention, in which the driving means comprise a motor.

FIG. 5 shows a fifth embodiment of the feeding railing in accordance with the invention comprising supply devices for supplementary fodder and fluids.

FIG. 1 shows a feeding railing 40 comprising a frame 41 and auxiliary frame 43 mounted on said frame by means of bolts 42. The auxiliary frame 43 comprises a plurality of spikes 44. These spikes 44 form part of an automatically locking system known per se. The frame 41 mainly consists of a plate 48 bent over at its top end. With the plate are connected supports 45 having one half of a bearing race lying on a wheel axle 46. The wheel axle 46 is provided with a number of wheels 47 rigidly secured thereto.

It is shown that the frame plate 48 has connected with it a floor plate 49 which extends rearwardly over a given distance near the ground. When an animal, for example a cow, pushes his head between the spikes 44 to eat the fodder lying in front of the feeding railing, the cow steps with his forefeet on the floor plate 49. Thus by pushing the spikes 44 the cow will not turn over the feeding railing 40. In this way the desired stability of the feeding railing 40 is ensured.

As is shown in FIG. 1 the feeding railing 40 comprises driving means 50 for the wheels 47. The driving means 50 comprise buffer means formed by a spring 52 accommodated in a sleeve 51 rigidly secured to the frame. To the free end of the spring 52 is fastened a strap 53, which is connected with the periphery of the wheel axle 46. The driving means furthermore comprise a ratchet wheel 54 and a pawl 55 engaged by said wheel and connected with the frame. The ratchet wheel 54 and the pawl 55 block a movement of the feeding railing in rearward direction. Since the cows push the feeding railing forwards whilst eating, the strap 53 of the driving means 50 is wound around the axle 46. When the feeding railing 40 has to be returned to the initial position, when the fodder has been consumed completely or substantially, the pawl 55 is actuated with the aid of the push rod 56 in order to put it out of engagement with the ratchet wheel 54. Owing to the torque exerted by the spring 52 via the strap 53 on the wheel axle 46 the feeding railing can be moved back into the initial position without exerting any force. In this position the pawl is again brought into engagement with the pawl wheel 54 so that a new cycle can start.

FIG. 2 shows a feeding railing 1 comprising a frame 2 with a plurality of vertical spikes 3 fastened thereto and adapted to extend pairwise behind the heads 4 of cows 5 on both sides of the necks 6, said spikes being spaced apart by a distance which is larger than the width of the neck 6 and smaller than the width of the withers 7. The frame 2 is provided with wheels 8 rotatable around wheel axles 9 carried by the frame 2, said axles being provided with pulleys 10. The frame comprises vertical hollow spikes 11, with which by hooks 12 are coupled helical springs 13 by one end, the other end of which is connected with a flexible strip 14, the other end of which is connected with a pulley 10 in a manner such that during the forward displacement of the feeding railing 1, owing to the rotation of the wheels 8 and the resultant rotation of the pulleys 10 via the flexible strip 14 the helical spring 13 is stretched and its potential energy is raised.

To the wheel axles 9 is furthermore fastened a ratchet wheel 15, the teeth of which can co-operate with a ratchet pawl 16 coupled with the frame. Without further explanation it will be understood that owing to the co-operation of the ratchet wheel 15 and the ratchet pawl 16 the forward displacement of the railing 1 can be freely performed, whereas the rearward displacement is blocked, since the rotation of the wheels 18 is free or blocked respectively in the associated direction of rotation. In the normal state of operation the ratchet pawl tends by gravity to occupy the position shown in FIG. 1. The release of the ratchet mechanisme 15, 16 can be performed by depressing a release knob 18 against the pressure of a spring 17. By this depression the active part of the ratchet pawl 16 is brought out of engagement with the ratchet wheel 15 through a rod 19.

It will be obvious that after a given amount of energy is stored in the helical springs 13 the feeding railing 1 is pushed in the rearward direction when the ratchet mechanisme 15, 16 is released.

The Figure shows a stack of fodder 20. In order to constantly maintain a given distance between the railing 1 and the stack of fodder 20 a spacing plate 21 is provided, which, in addition, ensures the stability when the railing is pushed forwards. A further function of the spacing plate 21 consists in that spilled fodder will not remain lying on the stable floor, since it remains accessible for the cows 5 for consumption.

Referring to FIGS. 3 and 4 it will be described more fully which steps have furthermore been taken to ensure the stability of the feeding railing.

FIG. 3 shows a cross-sectional view of the feeding railing 22 having wheels 23 and a spacing plate 21 for maintaining a distance from the stack of fodder 20. The broken lines indicate the situation at an earlier instant. Reference numerals are not used thereto.

In the embodiment shown in FIG. 3 a weight 25 is adapted to move up and down in a vertical, hollow column 24. The weight 25 is connected through a cable 28 with an ear 29 fastened to the feeding railing 22. The cable 28 extends via the pulley 26 at the top end of the vertical, hollow column 24 and along a guide wheel 27 at the lower end thereof.

Without further explanation it will be obvious that in this case during the forward displacement of the feeding railing 22 the weight 25 is gradually lifted, its potential energy being thus raised.

The column 24 comprises guard means 30 (not shown in detail) that can be released through a release knob 31 and that are adapted to a releasable blocking of the upward displacement of the cable 28.

FIG. 4 shows an elevational view like FIG. 3 of a fourth embodiment 32 of a feeding railing comprising wheels 34 that can be driven by a motor 33.

Like FIG. 3 FIG. 4 illustrates by broken lines a situation at an earlier instant, the associated reference numerals being omitted.

With regard to the variant shown in FIG. 4 it will be obvious that by selective energization of the motor 33 the animals are allowed to take fodder only at the instants as desired by the user. In this way the feeding railing embodying the invention can be employed as a fodder dosing device.

FIGS. 3 and 4 clearly show the presence of a plate 35 on which the forefeet 36 of the cows 5 are standing. Thus the cow's own weight guarantees the stability of the feeding railings 22 and 32. The pushing force in the direction towards the stack of fodder 20 is constantly supplied by the hindlegs 37 of the animals 5.

It should be noted that owing to the forward pressure exerted by the animals 5 in the direction of the arrows 38 the plates 35 are slightly raised by the tilting movement of the entire construction so that friction due to the plates 35 in the forward direction is limited. Therefore and also by the carrier function of the wheels 23, 33 easy displacement in the forward direction is always ensured.

The feeding railing 60 shown in FIG. 5 also comprises a plate-shaped frame 61 and a floor 62 being integral with the former. The frame 61 has mounted on it an auxiliary frame 63 comprising the spikes. With the frame plates 61 are connected supports 64, which bear on the axle 66 provided with wheels 65. According to the invention this feeding railing 60 is provided with a supply device 68 for supplementary fodder 75, for example, concentrates. In this embodiment the supply device 68 has the shape of a worm conveyor. Near each interstice of two spikes of the main frame 63 the supply device 68 is provided with a supply flap 69, which can be actuated by a flap control 70. By opening the flap an amount of concentrates can be brought along the chute plate 76 into the hollow dish plate 71. The front railing 60 is furthermore provided with a fluid supply conduit 72, which is also provided with a flap 73 near each interstice between to spikes. By actuating the flap 73 an amount of fluid can be introduced into the hollow dish plate 71. Between two neighbouring floor plates a partition 74 is arranged to prevent the animals from picking up fodder from the adjacent feeding place.

The flaps 69 and 73 are preferably controlled by a so-called animal identifying system. In such an animal indentifying system each animal carries a collar or the like provided with an element by means of which a control-device coupled with sensors 78 provided at each feeding place can identify the animal concerned. In accordance with the individual need of the animal the control-device actuates the concentrates flap 69 and the fluid flap 73 so that the animal concerned automatically receives the required amount of supplementary fodder when taking in the roughage.

The invention is not limited to the embodiments shown. For example, combinations of the particularities shown according to the invention are possible, for example a motor in conjunction with buffer means.

Furthermore, the buffer means may have other forms than those illustrated and described; they may, for example, be of a hydraulic or pneumatic type.

What is claimed is:

1. A feeding railing for animals comprising a frame, a plurality of vertical spikes fastened to said frame and adapted to extend pairwise behind the animal's head on both sides of the neck and being spaced apart by a distance which is larger than the width of the neck and smaller than the width of the withers of the animal and comprising at least one wheel supporting the frame so as to be movable along the ground, characterized in that the frame has connected with it a floor plate extending rearwardly over a given distance near the ground and by driving means comprising buffer means for the wheel for storing energy during the rotation of the or each wheel in one direction and by releasable guard means for blocking the rotation in the other direction.

2. A feeding railing as claimed in claim 1 characterized in that the buffer means comprise a spring.

3. A feeding railing as claimed in claim 2, characterized in that the spring is a helical spring, one end of which is coupled with the periphery of the wheel axle and the other end with the frame.

4. A feeding railing as claimed in claim 2, characterized in that the spring is a spiral spring, the outer end of which is connected with the associated wheel axle and the inner end of which is connected with the frame.

5. A feeding railing as claimed in claim 1, characterized in that the buffer means comprise a vertically movable weight connected with a pulley coupled with the associated wheel axle.

6. A feeding railing as claimed in any one of claims 1 to 5, characterized in that the guard means comprise a ratchet mechanism.

7. A feeding railing as claimed in claim 3 characterized by a supply device for supplementary fodder.

8. A feeding railing for animals comprising a frame, a plurality of vertical spikes fastened to said frame and adapted to extend pairwise behind the animal's head on both sides of the neck and being spaced apart by a distance which is larger than the width of the neck and smaller than the width of the withers of the animal, a floor plate connected to said frame at its forward portion which is elevated above the ground and extending rearwardly therefrom for a limited distance into ground engaging position whereby an animal having its head positioned between a pair of said spikes will have its forefeet on the floor plate forwardly of said ground engaging position while its hindfeet will be on the ground, and wheel means disposed adjacent the forward portion of said floor plate for supporting said frame so that the animal may readily move the feeding railing forward by thrusting with its hindfeet.

9. A feeding railing as defined in claim 8 including a scoop-like spacing plate extending forwardly of said frame beyond said wheel means for engaging the ground in the event said floor plate is tilted so that its rearward portion disengages the ground.

10. A feeding railing as claimed in claim 8 characterized by a supply device for supplementary fodder.

11. A feeding railing as claimed in claim 8 characterized by a supply device for fluid.

12. A feeding railing as claimed in claim 10, characterized in that near every pair of spikes the frame has connected with it a sensor of an animal identifying system controlling the supply device.

13. A feeding railing as claimed in claim 10, characterized in that near every pair of spikes the frame has connected with it a sensor of an animal identifying system controlling the supply device.

* * * * *